United States Patent
Shimamoto et al.

(10) Patent No.: US 11,841,721 B2
(45) Date of Patent: Dec. 12, 2023

(54) VOLTAGE REGULATOR AND IN-VEHICLE BACKUP POWER SUPPLY

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Kazushi Shimamoto, Yokkaichi (JP); Yuuki Sugisawa, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 213 days.

(21) Appl. No.: 17/610,568

(22) PCT Filed: Apr. 27, 2020

(86) PCT No.: PCT/JP2020/017930
§ 371 (c)(1),
(2) Date: Nov. 11, 2021

(87) PCT Pub. No.: WO2020/230605
PCT Pub. Date: Nov. 19, 2020

(65) Prior Publication Data
US 2022/0221887 A1    Jul. 14, 2022

(30) Foreign Application Priority Data

May 15, 2019    (JP) .................................. 2019-091925

(51) Int. Cl.
*G05F 1/56* (2006.01)
*G06F 1/30* (2006.01)
*H02J 9/06* (2006.01)

(52) U.S. Cl.
CPC .................. *G05F 1/56* (2013.01); *G06F 1/30* (2013.01); *H02J 9/06* (2013.01)

(58) Field of Classification Search
CPC ................. G05F 1/56; G06F 1/30; H02J 9/06
(Continued)

(56) References Cited

U.S. PATENT DOCUMENTS

2004/0140845 A1*  7/2004  Eberlein ................. G05F 1/575
                                                    327/541
2012/0223688 A1*  9/2012  Iriarte ..................... G05F 3/262
                                                    323/280
(Continued)

FOREIGN PATENT DOCUMENTS

| JP | H4-82711 U | 7/1992 |
| JP | 2006-293492 A | 10/2006 |
| JP | 2010-198405 A | 9/2010 |

OTHER PUBLICATIONS

International Search Report, Application No. PCT/JP2020/017930, dated Jul. 7, 2020. ISA/Japan Patent Office.

*Primary Examiner* — Alfonso Perez Borroto
(74) *Attorney, Agent, or Firm* — Honigman LLP

(57) ABSTRACT

The present disclosure realizes a configuration capable of setting and changing the value of a voltage that is output from a voltage regulator, while suppressing an increase in the size of an apparatus and keeping the apparatus from being complex. A control unit of a voltage regulator operates to switch a state of each port to either a first state or a second state. An input circuit unit applies a voltage corresponding to the combination of the first states at the ports to the base of a transistor. Electricity flows through the transistor when at least one of the ports is in the first state. A switch is turned on when electricity flows through the transistor. A Zener
(Continued)

diode sets an output voltage applied to a second conductive path to a voltage corresponding to a voltage applied to the base of the transistor.

7 Claims, 3 Drawing Sheets

(58) Field of Classification Search
USPC .......................................................... 307/66
See application file for complete search history.

(56) References Cited

U.S. PATENT DOCUMENTS

2015/0286232 A1\* 10/2015 Parikh ........................ G05F 1/56
323/273
2018/0083533 A1\* 3/2018 Price .......................... G05F 1/56

\* cited by examiner

FIG. 2

| Port P1 | Port P2 | Vb |
|---|---|---|
| Hi | Hi | Vcc × 0.8 |
| Hi | Lo | Vcc × 0.4 |
| Lo | Hi | Vcc × 0.2 |
| Lo | Lo | Voltage regulator OFF |

VOLTAGE REGULATOR AND IN-VEHICLE BACKUP POWER SUPPLY

CROSS-REFERENCE TO RELATED APPLICATIONS

This application is the U.S. national stage of PCT/JP2020/017930 filed on Apr. 27, 2020, which claims priority of Japanese Patent Application No. JP 2019-091925 filed on May 15, 2019, the contents of which are incorporated herein.

TECHNICAL FIELD

The present disclosure relates to a voltage regulator and an in-vehicle backup power supply.

BACKGROUND

JP 2015-201170A discloses a voltage regulation circuit having a low-dropout voltage regulator and a current source. In this circuit, the low-dropout voltage regulator has an output unit joined to a power supply input portion of a load circuit, and is configured to provide a power supply voltage to the load circuit. The current source is joined to a power supply input portion of the load circuit and an output portion of the low-dropout voltage regulator, and provides a current to the load circuit to reduce the current provided to the load circuit by the low-dropout voltage regulator.

A voltage regulator such as a linear regulator has a function of outputting a predetermined output voltage based on an input voltage. However, depending on the usage environment, there may be cases where the setting of the output voltage needs to be changed in accordance with the situation. In order to meet such a demand, a plurality of voltage regulators having different output voltages may be prepared. However, simply increasing the number of voltage regulators makes an apparatus larger and more complex.

Therefore, it is an object of the present invention to provide a technique capable of realizing a configuration in which a value of voltage output from a voltage regulator can be set and changed, while suppressing an increase in the size of an apparatus and keeping the apparatus from being complex.

SUMMARY

A voltage regulator according to an embodiment of the present disclosure is a voltage regulator configured to receive an input voltage based on power supplied via a first conductive path, and output an output voltage to a second conductive path. The voltage regulator includes a control unit, an input circuit, a transistor, a switch and an element portion. The control unit includes a plurality of output terminals. The input circuit unit is electrically connected to the plurality of output terminals. The transistor includes a first terminal electrically connected to the input circuit unit. The switch is electrically connected to the first conductive path, the second conductive path, and the transistor. The element portion is interposed between a second terminal of the transistor and the second conductive path, wherein the control unit operates to switch a state of each of the plurality of output terminals to either a first state or a second state, the input circuit unit applies a voltage corresponding to a combination of the first states at the plurality of output terminals to the first terminal, electricity flows through the transistor when at least one of the output terminals is in the first state, the switch is turned on when electricity flows through the transistor, and the element portion sets the output voltage applied to the second conductive path to a voltage corresponding to the voltage applied to the first terminal.

An in-vehicle backup power supply according to an embodiment of the present disclosure, includes a power storage unit electrically connected to the above first conductive path and the above voltage regulator. Wherein, the control unit switches at least one of the plurality of output terminals to the first state in response to establishment of a backup condition.

Advantageous Effects of Invention

According to the present disclosure, it is possible to realize a configuration in which the value of the voltage output from the voltage regulator can be set and changed, while suppressing an increase in the size of an apparatus and keeping the apparatus from being complex.

BRIEF DESCRIPTION OF DRAWINGS

FIG. 2 is an explanatory diagram illustrating a relationship between an output from each port and a base voltage of a transistor in the voltage regulator according to the embodiment.

DETAILED DESCRIPTION OF PREFERRED EMBODIMENTS

Figure 1:
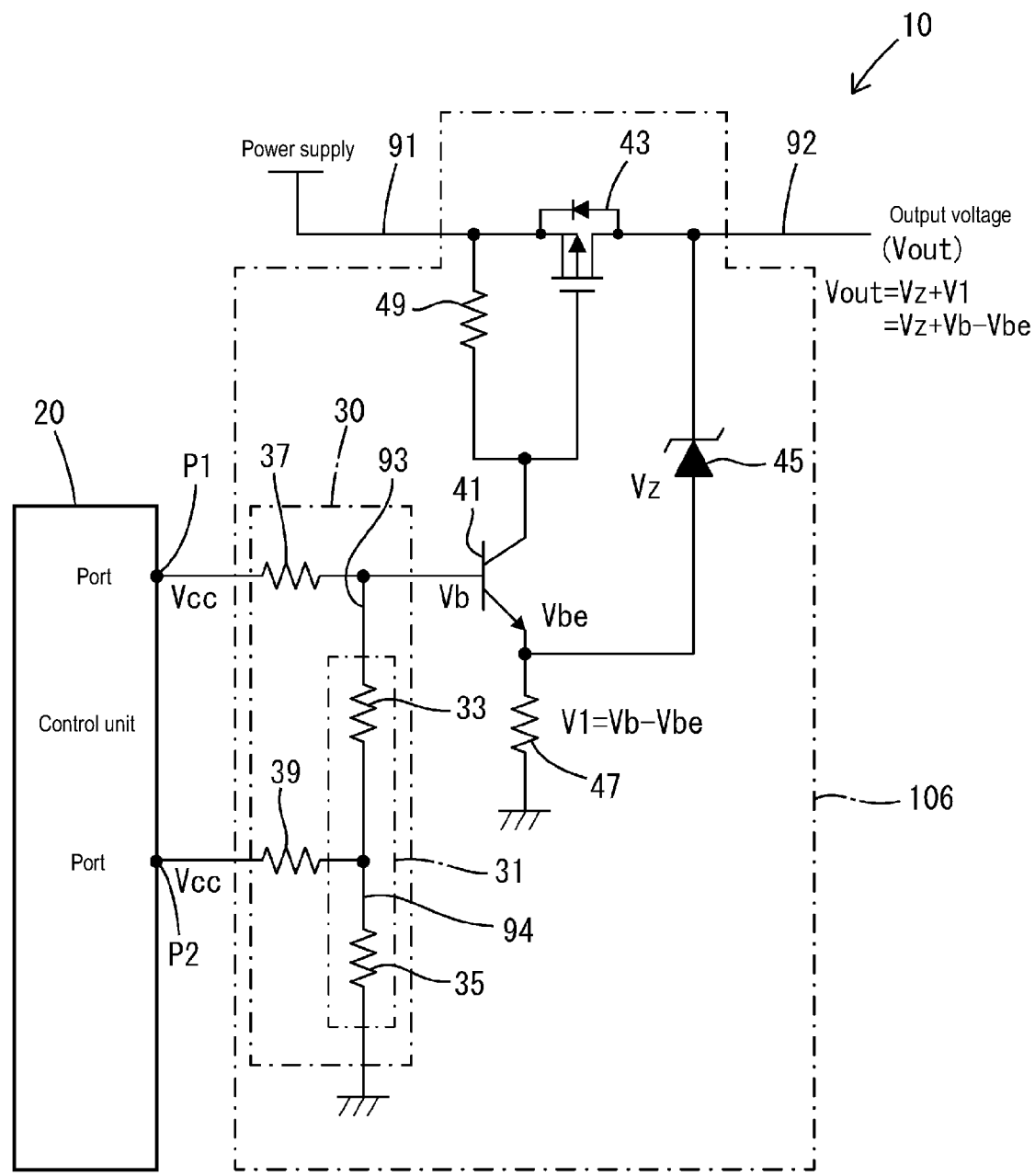
FIG. 1 is a circuit diagram illustrating a configuration of a voltage regulator according to an embodiment.

First, embodiments of the present disclosure will be listed and described.

In the voltage regulator according to an embodiment of the present disclosure:

(1) The control unit operates to switch a state of each of the plurality of output terminals to either the first state or the second state. The input circuit unit applies a voltage corresponding to a combination of the first states at the plurality of output terminals to the first terminal. Electricity flows through the transistor when at least one of the output terminals is in the first state, and the switch is turned on when electricity flows through the transistor. The element portion sets the output voltage applied to the second conductive path to a voltage corresponding to the voltage applied to the first terminal.

In the voltage regulator having the above-described configuration, the value of the output voltage is not limited to a predetermined fixed value, and the output voltage value can be changed. In addition, because a configuration in which the output voltage value can be changed based on the control by the control unit without using a large number of voltage regulators is adopted, it is possible to realize a "configuration in which an output voltage value can be set and changed", while suppressing an increase in the size of an apparatus and keeping the apparatus from being complex.

(2) The transistor may also be an NPN-type bipolar transistor, the first terminal may also be the base of the bipolar transistor, and the second terminal may also be the emitter of the bipolar transistor. The element portion may also be a Zener diode having a cathode electrically connected to the second conductive path and an anode electrically connected to the emitter. Further, the above voltage regulator may also include a resistor portion having one end electrically connected to the emitter and the other end electrically connected to the ground. The Zener diode may also set the output voltage applied to the second conductive path to a value corresponding to the sum of the Zener voltage of the Zener diode and the emitter voltage of the transistor.

This voltage regulator can stably switch the output voltage applied to the second conductive path to a value corresponding to the base voltage simply by changing the base voltage applied to the bipolar transistor, and such a configuration can be realized with a simpler element configuration.

(3) The first state may also be a state in which one of a high-level voltage and a low-level voltage is applied, and the second state may also be a state in which the other of a high-level voltage and a low-level voltage is applied. The input circuit unit may also include a series configuration portion in which a plurality of first resistor portions are connected in series between the first terminal and the ground, and a plurality of second resistor portions. At one end, the plurality of second resistor portions may also be electrically connected to the plurality of output terminals, respectively. Also, at the other end, the plurality of second resistor portions may also be electrically connected to a plurality of inter-element conductive paths in the series configuration portion, respectively.

In this voltage regulator, the voltage applied to the first terminal can be switched in stages based on the control of the plurality of output terminals by the control unit, and such a configuration can be realized with a simple configuration in which "the plurality of first resistor portions and the plurality of second resistor portions" are the main components. In addition, the control unit only has to switch the plurality of output terminals to a high-level voltage or a low-level voltage, thus the control of the control unit is also simplified.

(4) An in-vehicle backup power supply according to an embodiment of the present disclosure includes: a power storage unit electrically connected to the first conductive path; and the voltage regulator according to any one of (1) to (3) described above, wherein the control unit switches at least one of the plurality of output terminals to the first state in response to establishment of a backup condition.

This in-vehicle backup power supply has the same effects as the voltage regulator according to (1) to (3) described above.

Specific examples of a voltage regulator and an in-vehicle backup power supply according to the present disclosure will be described below with reference to the drawings. Note that the present invention is not limited to these examples, but defined by the scope of the claims, and is intended to include all modifications within the meaning and scope equivalent to the scope of the claims.

The voltage regulator of the present disclosure will be described with reference to FIGS. 1 and 2. A voltage regulator 10 shown in FIG. 1 has a configuration in which an input voltage is input based on power that is supplied via a first conductive path 91, and an output voltage is output to a second conductive path 92. The voltage regulator 10 includes a control unit 20, an input circuit unit 30, a transistor 41, a switch 43, a Zener diode (element portion) 45, a resistor (resistor portion) 47, and a resistor 49.

The control unit 20 is configured as, for example, a microcomputer, and includes a memory such as a CPU, a ROM, or a RAM. The control unit 20 operates, for example, on the bases of electric power supplied from a power supply, and can operate on power that is supplied from a backup power supply even when the supply of power from the power supply is interrupted. The control unit 20 has ports (output terminals) P1 and P2. The control unit 20 operates to switch a state of each of the ports P1 and P2 to either a first state or a second state. The first state is, for example, a state in which a voltage signal (high-level signal) of a voltage (Vcc) higher than the ground voltage (0V) is output. In other words, the first state is a state in which a predetermined high-level voltage is applied to the port (output terminal). The high-level voltage (Vcc) is, for example, 5V. Note that in this specification, the voltage means a potential difference from a ground potential (0V), unless otherwise specified. The second state is, for example, a state in which a voltage signal (low-level signal) of the ground voltage (0V) is output. In other words, the second state is a state in which a predetermined low-level voltage is applied to the port (output terminal).

The input circuit unit 30 is electrically connected to the ports P1 and P2. The input circuit unit 30 applies a voltage corresponding to a combination of the first state and the second state of the ports P1 and P2 to the base (first terminal) of the transistor 41 described later. The input circuit unit 30 includes a series configuration portion 31 and resistors (second resistor portions) 37 and 39. One end of the resistor 37 is connected to the port P1. The one end of the resistor 37 and the port P1 have the same potential. One end of the resistor 39 is connected to the port P2. The one end of the resistor 39 and the port P2 have the same potential. The series configuration portion 31 includes resistors (first resistor portions) 33 and 35. The resistors 33 and 35 are connected in series between the base of the transistor 41 and the ground. One end of the resistor 33 is connected to the other end of the resistor 37 and the base of the transistor 41. The one end of the resistor 33, the other end of the resistor 37, and the base of the transistor 41 have the same potential. One end of the resistor 35 is connected to the other end of the resistor 33 and the other end of the resistor 39. The one end of the resistor 35, the other end of the resistor 33, and the other end of the resistor 39 have the same potential. In this manner, the other end of the resistor 37 and the other end of the resistor 39 are connected to inter-element conductive paths 93 and 94 in the series configuration portion 31, respectively. The other end of the resistor 35 is connected to the ground, and has the ground potential.

The transistor 41 is configured as an NPN-type bipolar transistor. The base (first terminal) of the transistor 41 is electrically connected to the input circuit unit 30. The collector of the transistor 41 is connected to the other end of the resistor 49 described later and the gate of the switch 43. The collector of the transistor 41, the other end of the resistor 49, and the gate of the switch 43 have the same potential. The emitter (second terminal) of the transistor 41 is connected to one end of the resistor 47 described later and the anode of the Zener diode 45. The emitter of the transistor 41, the one end of the resistor 47, and the anode of the Zener diode 45 have the same potential. The transistor 41 is in an electricity-flowing state when at least one of the ports P1 and P2 is in the first state, and allows a current to flow from the collector to the emitter.

The switch 43 is configured as a P-channel MOSFET. The switch 43 is electrically connected to the first conductive path 91, the second conductive path 92, and the transistor 41. Specifically, the gate of the switch 43 is connected to the other end of the resistor 49 and the collector of the transistor 41. The source of the switch 43 is connected to the first conductive path 91. The source of the switch 43 and the first conductive path 91 have the same potential. The drain of the switch 43 is connected to the second conductive path 92. The drain of the switch 43 and the second conductive path 92 have the same potential. The switch 43 is turned on when the transistor 41 is in the electricity-flowing state.

The Zener diode 45 is interposed between the emitter of the transistor 41 and the second conductive path 92. The anode of the Zener diode 45 is connected to the emitter of the transistor 41 and one end of the resistor 47. The cathode of the Zener diode 45 is connected to the second conductive path 92. The cathode of the Zener diode 45 and the second conductive path 92 have the same potential. The Zener diode 45 sets an output voltage applied to the second conductive path 92 to a voltage corresponding to the voltage applied to the base of the transistor 41. Specifically, the Zener diode 45 sets the output voltage applied to the second conductive path 92 to a value corresponding to the sum of the Zener voltage and the emitter voltage of the transistor 41.

The resistor 47 is interposed between the transistor 41, the Zener diode 45, and the ground. One end of the resistor 47 is connected to the emitter of the transistor 41 and the anode of the Zener diode 45. The other end of the resistor 47 is connected to the ground, and has the ground potential.

The resistor 49 is interposed between the first conductive path 91 and the transistor 41. One end of the resistor 49 is connected to the first conductive path 91. The one end of the resistor 49 and the first conductive path 91 have the same potential. The other end of the resistor 49 is connected to the collector of the transistor 41 and the gate of the switch 43.

Next, control of an output voltage performed by the voltage regulator 10 will be described.

First, the control unit 20 operates to switch the state of each of the ports P1 and P2 to either the first state or the second state. That is to say, the control unit 20 outputs a high-level signal (a voltage signal having a magnitude of Vcc) or a low-level signal (a voltage signal having a magnitude of 0V) from the port P1 and the port P2.

The input circuit unit 30 applies a voltage corresponding to a combination of the first state and the second state at the ports P1 and P2 to the base of the transistor 41 described later. As shown in FIG. 2, for example, when a high-level signal is output from the port P1 and a high-level signal is output from the port P2, the voltage is divided by the input circuit unit 30, and a voltage Vb having a magnitude of Vcc×0.8 is applied to the base of the transistor 41. FIG. 2 shows the voltage Vb in a case where the resistors 33 and 35 and the resistors 37 and 39 all have the same resistance value. When a high-level signal is output from the port P1 and a low-level signal is output from the port P2, the voltage is divided by the input circuit unit 30, and a voltage Vb having a magnitude of Vcc×0.6 is applied to the base of the transistor 41. When a low-level signal is output from the port P1 and a high-level signal is output from the port P2, the voltage is divided by the input circuit unit 30, and a voltage Vb having a magnitude of Vcc×0.2 is applied to the base of the transistor 41. When a low-level signal is output from the port P1 and a low-level signal is output from the port P2, the voltage is divided by the input circuit unit 30, no voltage is applied to the base of the transistor 41, and the voltage regulator 10 is turned off.

The transistor 41 is in an electricity-flowing state when at least one of the ports P1 and P2 is in the first state (in a state where a high-level signal is output), and allows a current to flow from the collector to the emitter. Because a current flows through the resistor 49 when the transistor 41 is in the electricity-flowing state, a voltage is applied to the gate of the switch 43, and the switch 43 is turned on. When the switch 43 is turned on, a voltage is applied to the Zener diode 45. When the voltage applied to the Zener diode 45 (the output voltage applied to the second conductive path 92) increases to a certain level, a current flows from the cathode side to the anode side. When at least one of the ports P1 and P2 is in the first state, the Zener diode 45 breaks down, and the potential difference between the cathode and the anode is kept at the Zener voltage.

In this manner, the Zener diode 45 sets the output voltage Vout applied to the second conductive path 92 to a voltage corresponding to the voltage Vb applied to the base of the transistor 41. Specifically, the Zener diode 45 sets the output voltage Vout to a voltage corresponding to the sum of the Zener voltage Vz and the emitter voltage V1 of the transistor 41. In the example shown in FIG. 1, when the emitter voltage of the transistor 41 is a voltage V1 and the base-emitter voltage of the transistor 41 is a voltage Vbe, V1=Vb−Vbe, thus Vout=VZ+V1=Vz+Vb−Vbe. V1 is equal to the voltage across the resistor 47. In this manner, as shown in FIG. 2, the control unit 20 operates so as to switch the state of each of the ports P1 and P2 to either the first state or the second state, so that it is possible to apply a plurality of types of Vb to the base of the transistor 41, and it is possible to change the output voltage Vout accordingly. As described above, the single voltage regulator 10 can output output voltages of a plurality of magnitudes.

Figure 3:
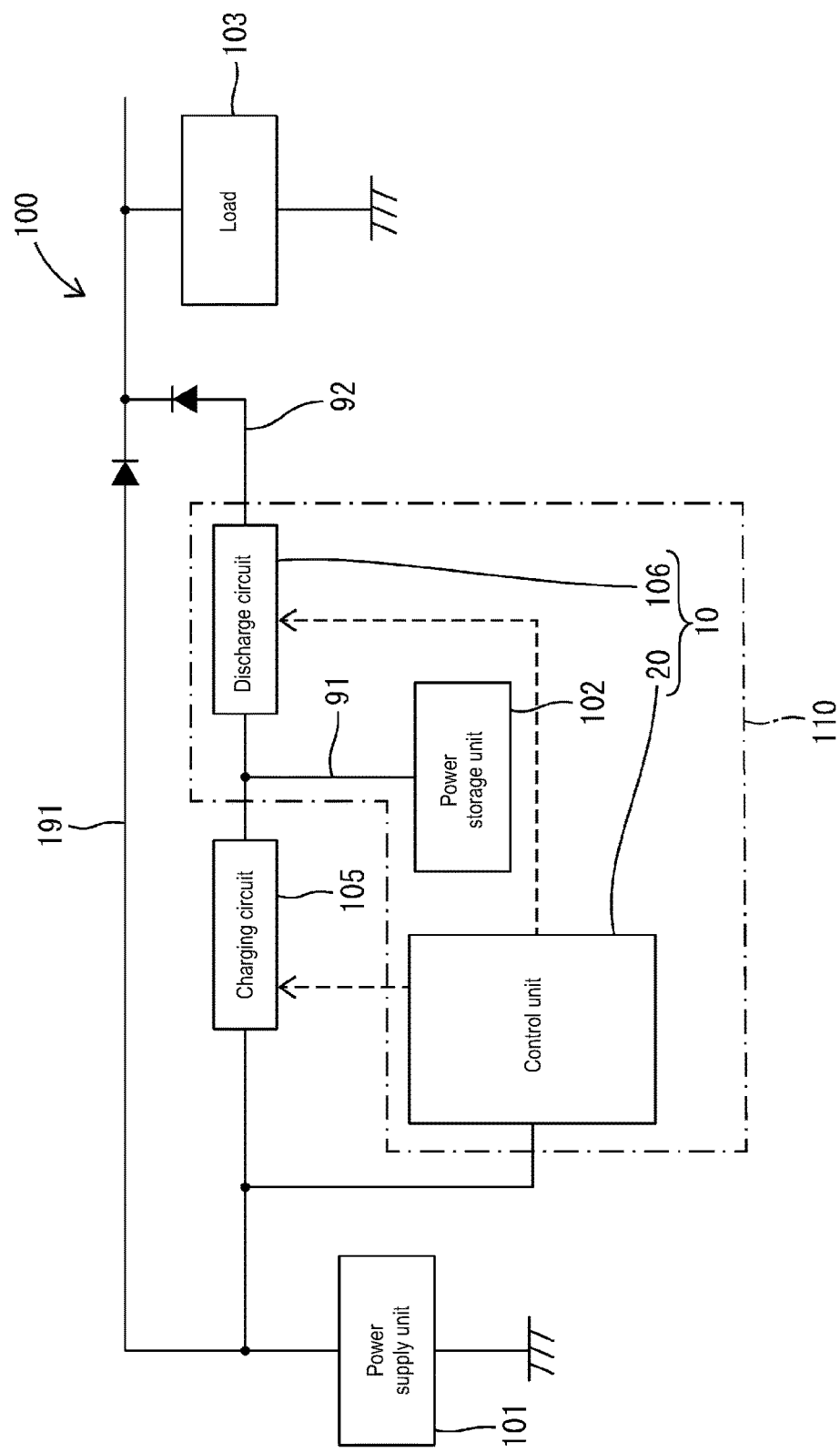
FIG. 3 shows an electrical configuration of an in-vehicle power supply system in which the voltage regulator according to the embodiment is applied as a discharge circuit from a power storage element.

Next, an in-vehicle power supply system 100 (hereinafter also referred to as a power supply system 100) to which an in-vehicle backup power supply (hereinafter also referred to as a backup power supply) of the present disclosure is applied will be described with reference to FIG. 3. The power supply system 100 shown in FIG. 3 includes an in-vehicle power supply unit 101 (hereinafter also referred to as a power supply unit 101), a backup power supply 110, a load 103, a charging circuit 105, and is configured as a system capable of supplying power to the load 103. The backup power supply 110 includes an in-vehicle power storage unit 102 (hereinafter also referred to as a power storage unit 102), a control unit 20, and a discharge circuit 106.

The power supply unit 101 functions as a main power supply. The power storage unit 102 functions as a backup power supply, and serves as a power supply source when power supply from the power supply unit 101 is interrupted. The power storage unit 102 is electrically connected to the first conductive path 91. The charging circuit 105 is a circuit that performs a charging operation of charging the power storage unit 102 based on power that is supplied from the power supply unit 101. The discharge circuit 106 is a circuit that performs a discharge operation of discharging power stored in the power storage unit 102. The discharge circuit 106 is electrically connected to the first conductive path 91 and the second conductive path 92. The discharge circuit 106 and the control unit 20 constitute the voltage regulator 10.

The discharge circuit 106 receives, from the control unit 20, a discharge instruction signal instructing that the power storage unit 102 be discharged or a discharge stop signal instructing that discharge of the power storage unit 102 be stopped, and performs a discharge operation of passing a discharge current from the power storage unit 102 to the load 103 and a cutoff operation of cutting off the discharge current. The control unit 20 transmits a discharge instruction signal in response to the establishment of a backup condition. In other words, the control unit 20 switches at least one of the plurality of ports P1 and P2 to the first state. Here, a backup condition is established, for example, when the voltage of the conductive path 191 falls to a predetermined threshold value or lower.

When the discharge circuit 106 receives a discharge instruction signal from the control unit 20, the discharge circuit 106 performs a step-down operation using the voltage of the first conductive path 91 to which the output voltage of the power storage unit 102 is applied as an input voltage, and performs a discharge operation so as to apply a changed output voltage to the second conductive path 92 on the output side. When the discharge circuit 106 receives a discharge stop signal from the control unit 20, the discharge circuit 106 stops such a discharge operation, and performs a cutoff operation so as to bring a portion between the second conductive path 92 and the power storage unit 102 into a non-conductive state. When the discharge circuit 106 is performing the discharge operation, the output current (discharge current) output from the discharge circuit 106 is supplied to the load 103.

The control unit 20 switches at least one of the ports P1 and P2 to the first state in response to the establishment of the backup condition (for example, a case where the value of the voltage of a conductive path 191 falls below a predetermined threshold value). In this manner, the control unit 20 can change the output voltage that is output from the discharge circuit 106 to the load 103 according to the type of switching of the ports P1 and P2 (see FIG. 2).

Such a voltage regulator 10 can be used for an initial check as to whether or not an output voltage of an appropriate voltage is output from the power storage unit 102.

As described above, in the voltage regulator 10 of the present disclosure, the control unit 20 operates to switch the state of each of the plurality of ports P1 and P2 to either the first state or the second state. The input circuit unit 30 applies a voltage corresponding to the combination of the first states at the plurality of ports P1 and P2 to the base of the transistor 41. The transistor 41 is in the electricity-flowing state when at least one of the ports P1 and P2 is in the first state, and the switch 43 is turned on when the transistor 41 is in the electricity-flowing state. The Zener diode 45 sets the output voltage applied to the second conductive path 92 to a voltage corresponding to the voltage applied to the base of the transistor 41.

In the voltage regulator 10 having such a configuration, the value of the voltage to be output is not limited to a predetermined fixed value, and the output voltage value can be changed. In addition, because the configuration in which the output voltage value can be changed based on the control performed by the control unit 20 without using a large number of voltage regulators is adopted, it is possible to realize a "configuration in which an output voltage value can be set and changed", while suppressing an increase in the size of an apparatus and keeping the apparatus from being complex.

In the voltage regulator 10 of the present disclosure, the transistor 41 is an NPN-type bipolar transistor. The Zener diode 45 has a cathode electrically connected to the second conductive path 92 and an anode electrically connected to the emitter of the transistor 41. Further, the voltage regulator 10 includes the resistor 47 having one end electrically connected to the emitter of the transistor 41 and the other end electrically connected to the ground. The Zener diode 45 sets the output voltage applied to the second conductive path 92 to a value corresponding to the sum of the Zener voltage of the Zener diode 45 and the emitter voltage of the transistor 41.

This voltage regulator 10 can stably switch the output voltage applied to the second conductive path 92 to a value corresponding to the base voltage simply by changing the base voltage applied to the transistor 41, and such a configuration can be realized with a simpler element configuration.

In the voltage regulator 10 of the present disclosure, the first state can be a state in which one of a high-level voltage and a low-level voltage is applied, and the second state is a state in which the other of a high-level voltage and a low-level voltage is applied. The input circuit unit 30 includes the series configuration portion 31 in which the plurality of resistors 33 and 35 are connected in series between the base of the transistor 41 and the ground, and the plurality of resistors 37 and 39. At one end, the plurality of resistors 37 and 39 are electrically connected to the plurality of ports P1 and P2, respectively. Also, at the other end, the plurality of resistors 37 and 39 are electrically connected to the plurality of inter-element conductive paths 93 and 94 in the series configuration portion 31, respectively.

In this voltage regulator 10, the voltage applied to the base of the transistor 41 can be switched in stages based on the control of the plurality of ports P1 and P2 by the control unit 20, and such a configuration can be realized with a simple configuration in which "the plurality of resistors 33 and 35 and the plurality of resistors 37 and 39" are the main components. In addition, the control unit 20 only has to switch the plurality of ports P1 and P2 to the high-level voltage or the low-level voltage, thus the control of the control unit 20 is also simplified.

Other Embodiments of the Present Disclosure

It should be understood that the embodiments disclosed herein are illustrative and non-restrictive in every respect. The following embodiments can be adopted, for example.

In the embodiment, the control unit 20 has two ports P1 and P2. However, in another embodiment, the control unit 20 may also have three or more ports.

In the embodiment, the resistance values of the resistors 33 and 35 and the resistors 37 and 39 are all the same (see FIG. 2). However, the resistance value of each resistor may also be freely changed. By changing the resistance value of each resistor, output voltages of various magnitudes can be output.

The invention claimed is:

1. A voltage regulator configured to receive an input voltage based on power supplied via a first conductive path, and output an output voltage to a second conductive path, the voltage regulator comprising:
a control unit having a plurality of output terminals;
an input circuit unit electrically connected to the plurality of output terminals;
a transistor having a first terminal electrically connected to the input circuit unit;
a switch electrically connected to the first conductive path, the second conductive path, and the transistor; and
an element portion interposed between a second terminal of the transistor and the second conductive path,
wherein the control unit operates to switch a state of each of the plurality of output terminals to either a first state or a second state,
the input circuit unit applies a voltage corresponding to a combination of the first states of the plurality of output terminals to the first terminal, electricity flows through the transistor when at least one of the output terminals is in the first state, the switch is turned on when electricity flows through the transistor, and the element portion sets the output voltage applied to the second conductive path to a voltage corresponding to the voltage applied to the first terminal.

2. The voltage regulator according to claim 1, wherein the transistor is an NPN-type bipolar transistor, the first terminal is a base of the bipolar transistor, the second terminal is an emitter of the bipolar transistor, the element portion is a Zener diode having a cathode electrically connected to the second conductive path and an anode electrically connected to the emitter, the voltage regulator further includes a resistor portion having one end electrically connected to the emitter and another end electrically connected to the ground, and the Zener diode sets the output voltage applied to the second conductive path to a value corresponding to the sum of the Zener voltage of the Zener diode and the emitter voltage of the bipolar transistor.

3. The voltage regulator according to claim 1, wherein the first state is a state in which one of a high-level voltage and a low-level voltage is applied, and the second state is a state in which the other of a high-level voltage and a low-level voltage is applied, the input circuit unit includes a series configuration portion in which a plurality of first resistor portions are connected in series between the first terminal and the ground, and a plurality of second resistor portions, and at one end, the plurality of second resistor portions are electrically connected to the plurality of output terminals, respectively, and at the other end, the plurality of second resistor portions are electrically connected to a plurality of inter-element conductive paths in the series configuration portion, respectively.

4. An in-vehicle backup power supply comprising:

a power storage unit electrically connected to the first conductive path; and the voltage regulator according to claim 1, wherein the control unit switches at least one of the plurality of output terminals to the first state in response to establishment of a backup condition.

5. The voltage regulator according to claim 2, wherein the first state is a state in which one of a high-level voltage and a low-level voltage is applied, and the second state is a state in which the other of a high-level voltage and a low-level voltage is applied, the input circuit unit includes a series configuration portion in which a plurality of first resistor portions are connected in series between the first terminal and the ground, and a plurality of second resistor portions, and at one end, the plurality of second resistor portions are electrically connected to the plurality of output terminals, respectively, and at the other end, the plurality of second resistor portions are electrically connected to a plurality of inter-element conductive paths in the series configuration portion, respectively.

6. The in-vehicle backup power supply according to claim 4, wherein the transistor is an NPN-type bipolar transistor, the first terminal is a base of the bipolar transistor, the second terminal is an emitter of the bipolar transistor, the element portion is a Zener diode having a cathode electrically connected to the second conductive path and an anode electrically connected to the emitter, the voltage regulator further includes a resistor portion having one end electrically connected to the emitter and another end electrically connected to the ground, and the Zener diode sets the output voltage applied to the second conductive path to a value corresponding to the sum of the Zener voltage of the Zener diode and the emitter voltage of the bipolar transistor.

7. The in-vehicle backup power supply according to claim 4, wherein the first state is a state in which one of a high-level voltage and a low-level voltage is applied, and the second state is a state in which the other of a high-level voltage and a low-level voltage is applied, the input circuit unit includes a series configuration portion in which a plurality of first resistor portions are connected in series between the first terminal and the ground, and a plurality of second resistor portions, and at one end, the plurality of second resistor portions are electrically connected to the plurality of output terminals, respectively, and at the other end, the plurality of second resistor portions are electrically connected to a plurality of inter-element conductive paths in the series configuration portion, respectively.

* * * * *